United States Patent
Ohnishi et al.

(10) Patent No.: US 8,908,982 B2
(45) Date of Patent: Dec. 9, 2014

(54) IMAGE ENCODING DEVICE AND IMAGE ENCODING METHOD

(75) Inventors: Mitsuhisa Ohnishi, Osaka (JP); Masayuki Yamaguchi, Osaka (JP); Takahiro Morishita, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 46 days.

(21) Appl. No.: 13/989,963

(22) PCT Filed: Sep. 26, 2011

(86) PCT No.: PCT/JP2011/071828
§ 371 (c)(1), (2), (4) Date: May 28, 2013

(87) PCT Pub. No.: WO2012/073585
PCT Pub. Date: Jun. 7, 2012

(65) Prior Publication Data
US 2013/0251257 A1    Sep. 26, 2013

(30) Foreign Application Priority Data
Nov. 29, 2010 (JP) .................................. 2010-264516

(51) Int. Cl.
G06K 9/36  (2006.01)
G06K 9/46  (2006.01)
G06T 9/00  (2006.01)
H04N 19/90  (2014.01)
H04N 19/50  (2014.01)
H04N 19/149  (2014.01)
H04N 19/103  (2014.01)
H04N 19/182  (2014.01)
H04N 1/64  (2006.01)

(52) U.S. Cl.
CPC ............ *G06T 9/00* (2013.01); *H04N 19/00945* (2013.01); *H04N 19/00569* (2013.01); *H04N 19/00181* (2013.01); *H04N 19/00018* (2013.01); *H04N 19/00303* (2013.01); *H04N 1/64* (2013.01)
USPC .......................................... 382/234; 382/238

(58) Field of Classification Search
USPC ........................... 382/166, 234, 238, 239, 240
See application file for complete search history.

(56) References Cited

U.S. PATENT DOCUMENTS 6,067,382 A    5/2000  Maeda
6,606,415 B1 *  8/2003  Rao ............................. 382/239
(Continued)

FOREIGN PATENT DOCUMENTS

JP    10-224640 A    8/1998
JP    2007-281758 A   10/2007
(Continued)

*Primary Examiner* — Phuoc Tran
(74) *Attorney, Agent, or Firm* — Birch, Stewart, Kolasch & Birch, LLP

(57) ABSTRACT

The present invention provides an image encoding device that can balance encoding at a high compression ratio and restoration of a high-quality image by decoding in a short processing time. Compression mode determination means 3 determines a compression mode to be one of DPCM and PCM based on target pixel data inputted from a terminal 21 and predicted data calculated by a predetermined method. For the DPCM, DPCM compression means 5 compresses a difference value between the target pixel data and the predicted data to DPCM encoded data having a predetermined DPCM code length. For the PCM, PCM compression means 7 compresses the target pixel data to PCM encoded data having a PCM code length determined by PCM code length determination means 9. The PCM code length determination means 9 calculates the PCM code length for each piece of target pixel data such that a total of post-encoding code lengths becomes an allowable value or less in a unit of predetermined pixel group among the plurality of pixels. Tag/code output means 13 outputs the encoded data by adding a tag indicating whether the compression mode is the DPCM or the PCM to the encoded data.

13 Claims, 6 Drawing Sheets

(56) References Cited

U.S. PATENT DOCUMENTS

| | | | |
|---|---|---|---|
| 8,107,752 B2 * | 1/2012 | Jiao et al. | 382/238 |
| 2008/0317116 A1 | 12/2008 | Lee et al. | |
| 2009/0016624 A1 * | 1/2009 | Sung et al. | 382/238 |
| 2010/0220936 A1 | 9/2010 | Yamaguchi et al. | |

FOREIGN PATENT DOCUMENTS

| | | |
|---|---|---|
| JP | 2008-48396 A | 2/2008 |
| JP | 2010-4514 A | 1/2010 |
| JP | 2010-56600 A | 3/2010 |

* cited by examiner

Fig. 4A

| t1 | code1 (21bit) |
| t2 | code2 (21bit) |
| t3 | code3 (21bit) |
| t4 | code4 (21bit) |
| t5 | code5 (24bit) |
| t6 | code6 (21bit) |
| t7 | code7 (21bit) |
| t8 | code8 (24bit) |
| t9 | code9 (27bit) |
| t10 | code10 (27bit) |

Fig. 4B

| t1 | code1 (21bit) | t2 | code2 (21bit) |
| t3 | code3 (21bit) | t4 | code4 (21bit) |
| t5 | code5 (24bit) | t6 | code6 (21bit) |
| t7 | code7 (21bit) | t8 | code8 (24bit) |
| t9 | code9 (27bit) | t10 | code10 (27bit) |
| padding(2bit) | | | |

IMAGE ENCODING DEVICE AND IMAGE ENCODING METHOD

CROSS-REFERENCE TO RELATED APPLICATIONS

This application is a National Phase filing under 35 U.S.C. §371 of International Application No. PCT/JP2011/071828 filed on Sep. 26, 2011, and which claims priority to Japanese Patent Application No. 2010-264516 filed on Nov. 29, 2010.

TECHNICAL FIELD

The present invention relates to an image encoding device, particularly to an image encoding device and an image encoding method, which are suitably incorporated in an interface of an image memory or a bus to reduce an image memory capacity or an access bandwidth.

BACKGROUND ART

Nowadays, with the progress of semiconductor technology and high-definition image data, an amount of image data to be processed by a device or system is being explosively increased. On the other hand, in performing image processing, it is frequently necessary to temporarily retain intermediate image data in the progress of processing.

In an image processing device, generally the image data is stored in an internal buffer or an external memory through a memory interface or a bus. For example, in the case that a full hi-vision image of 30 bits per pixel, of which 60 images are transmitted per second, is processed while intermediate image data of three screens per one full hi-vision screen is stored in the memory, a data transfer capability of 1920 (pixel)×1080 (pixel)×60 (images)×30 (bit)×3 (screen)×2 (times (read, write))=about 22.4 Gbit/sec and a memory capacity of 1920 (pixel)×1080 (pixel)×30 (bit)×3 (screen)= about 186 Mbits are required, and an actual circuit is hardly constructed. Therefore, it is necessary to reduce the amount of data stored in the memory.

A method for performing encoding processing to the image data is used as one of data amount reducing methods. Conventionally, in the encoding method, there are PCM (Pulse Code Modulation) and DPCM (Differential Pulse Code Modulation).

The PCM is a technique of sampling a signal at constant time intervals to quantize the signal into an integral value having the defined number of bits. Although originally the PCM is a method for converting an analog signal into a digital signal, the PCM can also be used to compress digital data. The DPCM is a prediction encoding technique in which the sampled value is not directly encoded but a difference between the sampled value and a signal value of a predicted image is encoded. Adaptive DPCM (ADPCM) technique in which a quantization step is adaptively changed using information on a degree of complexity of a local image is also proposed as an improved DPCM technique.

Additionally, various image compression technologies are proposed. For example, variable length coding methods such as Huffman coding is adopted as an invertible transform to some of various compression techniques, and a complicated processing technology in which an orthogonal transform typified by DCT (Discrete Cosine Transform) is used is adopted to an image compression algorithm, such as JPEG and MPEG, which is aimed at a high compression ratio.

In image compression for a frame memory, it is necessary to ensure a visually-high-quality image and to perform compression or decompression processing at the high compression ratio in real time. In order to satisfy the demand, the inventors developed an encoding method, in which the encoding processing is performed while the PCM and the DPCM are switched according to a difference value between a pixel and an adjacent pixel, as a fixed length compression method for each pixel (see Patent Document 1).

In the technology disclosed in Patent Document 1, an error is increased in a place where a visual sensitivity of human eyes is low, namely, a place where the difference between the pixel and the adjacent pixel is large, and the error is decreased in a place where the visual sensitivity of human eyes is high, namely, a place where the difference between the pixel and the adjacent pixel is small, thereby implementing the high-quality image compression.

PRIOR ART DOCUMENT

Patent Document

Patent Document 1: Japanese Patent Publication Laid-Open No. 2010-4514

SUMMARY OF THE INVENTION

Problems to be Solved by the Invention

Nowadays, a size of treating image is enlarged, and it is necessary to further enhance the compression ratio. However, in the fixed length compression for each pixel like Patent Document 1, it is difficult to enhance the compression ratio above a certain level.

Formally, the compression ratio can be enhanced by performing the encoding using the short fixed length. However, shortening the fixed length leads to many dropping digits in the case of the compression method, such as the PCM, in which the encoding is performed to the original data. In this case, the accuracy of the post-decoding image is degraded. In order to maintain the restored image quality to some extent, it is necessary that the post-encoding fixed length ensure a length of some extent. For this reason, the compression ratio cannot be enhanced above a certain level.

It is conceivable that an encoding constraint that is of the fixed length is removed in order to solve the problem. However, in the case that the code length is simply variable, a decoding side cannot previously learn a cut line between continuously-generated codes. Even if a special code indicating the cut line is inserted between the codes, it is necessary to perform the decoding after the special code is recognized, the encoding device cannot start the decoding processing until checking the special code in an encoded sequence transmitted in a stream shape. That is, the decoding cannot be performed in real time, but it takes a lot of time to perform the decoding processing. Because the decoding is sequentially performed in principle, parallel processing is difficult to perform, which results in a problem in that it takes a lot of time to perform the decoding processing.

The present invention has been devised to solve the problems described above, and an object thereof is to provide an image encoding device and an image encoding method, which can balance the encoding at the high compression ratio and the restoration of the high-quality image by decoding in the short processing time.

Means for Solving the Problem

An image encoding device of the present invention made in order to solve the problems described above, is configured to perform encoding processing by compressing image data including pieces of pixel data of a plurality of pixels arrayed in a scanning sequence, and the image encoding device includes:

compression mode determination means for determining a compression mode of target pixel data of the encoding processing to be one of DPCM and PCM based on the target pixel data and predicted data calculated by a predetermined method;

DPCM compression means for compressing a difference value between the target pixel data and the predicted data to DPCM encoded data having a predetermined DPCM code length when the compression mode determination means determines the compression mode to be the DPCM;

PCM compression means for compressing the target pixel data to PCM encoded data having an assigned PCM code length when the compression mode determination means determines the compression mode to be the PCM;

PCM code length determination means for calculating the PCM code length for each piece of the target pixel data such that a total of post-encoding code lengths becomes an allowable value or less in a unit of predetermined pixel group among the plurality of pixels, and transmitting the PCM code length to the PCM compression means; and tag/code output means for producing and outputting output encoded data by adding a tag indicating whether the compression mode is the DPCM or the PCM according to the compression mode to the DPCM encoded data outputted from the DPCM compression means or the PCM encoded data outputted from the PCM compression means.

According to the image encoding device, in the case that the PCM is used as the compression mode, the PCM code length can be determined for each target pixel data within the range of the allowable total of the code lengths in the unit of predetermined pixel group. The value calculated based on the maximum capacity of the memory is used as the allowable total of the code lengths, and the PCM code length is increased as much as possible. Therefore, the high-quality image can be restored to the extent possible without generating the situation in which the decoding cannot be performed.

According to the method, using the tag added to the head, the decoding device side can recognize whether the compression processing is performed according to the compression mode of the PCM or the DPCM. In the DPCM, because the code length is previously fixed, when the information on the DPCM code length is provided to the decoding device side, the decoding device side can learn the code length at a pre-stage of the decoding processing, and the time necessary for the decoding processing can be shortened.

The code length of the DPCM is fixed, and the PCM code length determination method is performed based on a predetermined rule, so that the decoding device side can include the identical determination mechanism. With this configuration, the decoding can concurrently be performed to the plurality of pixels by previously reading the tags of the plurality of pixels, so that the time necessary for the decoding processing can be further shortened.

As a rule of determination of the PCM code length by the PCM code length determination means, more specifically, based on initial setting data including information on the number of pixels constituting the predetermined pixel group and the allowable value and progress data including information on the number of processed pixels in which encoding processing of pixel data is already completed among the pixels constituting the predetermined pixel group and a processed code length total that is a total of post-encoding code lengths of the processed pixels, the PCM code length determination means derives the number of unprocessed pixels at the time of processing among the number of pixels constituting the predetermined pixel group and a producible code length total, and determines the PCM code length by a maximum code length which is a maximum value of an identical code length in a case where a total code length of pixel data of the number of the unprocessed pixels encoded using the identical code length does not exceed the producible code length total.

Further specifically, when the initial setting data is configured to include information on the number of pixels constituting the predetermined pixel group, information on the allowable value, and information on the number of colors per pixel, the PCM code length determination means uses a maximum integer X satisfying the following expression $$(T+X \cdot C) \cdot (A-Zr) \le (M-Zm)$$

to determine the PCM code length, where A is the number of pixels constituting the predetermined pixel group, M is the allowable value, and C is the number of colors, which are information included in the initial setting data, Zr is the number of processed pixels and Zm is the processed code length total, which are information included in the progress data, and T is the code length of the tag.

When the tag is 1 bit, as a matter of course, the PCM code length determination means uses a maximum integer X satisfying the following expression $$(1+X \cdot C) \cdot (A-Zr) \le (M-Zm)$$

to determine the PCM code length.

The predetermined pixel group is a plurality of pixels constituting one line in the image data, and the allowable value is a maximum value of a line memory. In performing the encoding in each line, the image encoding can be implemented without exceeding the line memory such that the degradation is reduced during the decoding.

Similarly, the predetermined pixel group is a plurality of pixels constituting one frame in the image data, and the allowable value is a maximum value of a frame memory. In performing the encoding in each frame, the image encoding can be implemented without exceeding the line memory such that the degradation is reduced during the decoding.

The PCM code length determination means may be configured such that the PCM code length can be externally assigned. In this case, the PCM code length determination means is configured to output the assigned PCM code length to the PCM compression means when the PCM code length is assigned.

With this configuration, for example, the longer code length can flexibly be assigned for the area where a user desires to restore the particularly strict image. More specifically, it is conceivable that, in the case where the encoding is performed in such a manner that the screen is divided into right and left, a pixel column from a left end to a central portion is set to one line, and a pixel column from the central portion to a right end is set to another line, when the pixel data of the head pixel in the right-half screen is encoded, the PCM code length is set to a large value. Therefore, the image disturbance generated in the central portion of the screen can be prevented in checking the restored image data.

Effect of the Invention

The configuration of the present invention can construct the image encoding device that can balance the encoding at the high compression ratio and the restoration of the high-quality image by decoding in the short processing time.

BRIEF DESCRIPTION OF THE DRAWINGS

FIG. 4 is a view illustrating a case in which pieces of encoded data are outputted by two pixels.

MODE FOR CARRYING OUT THE INVENTION

Figure 1:
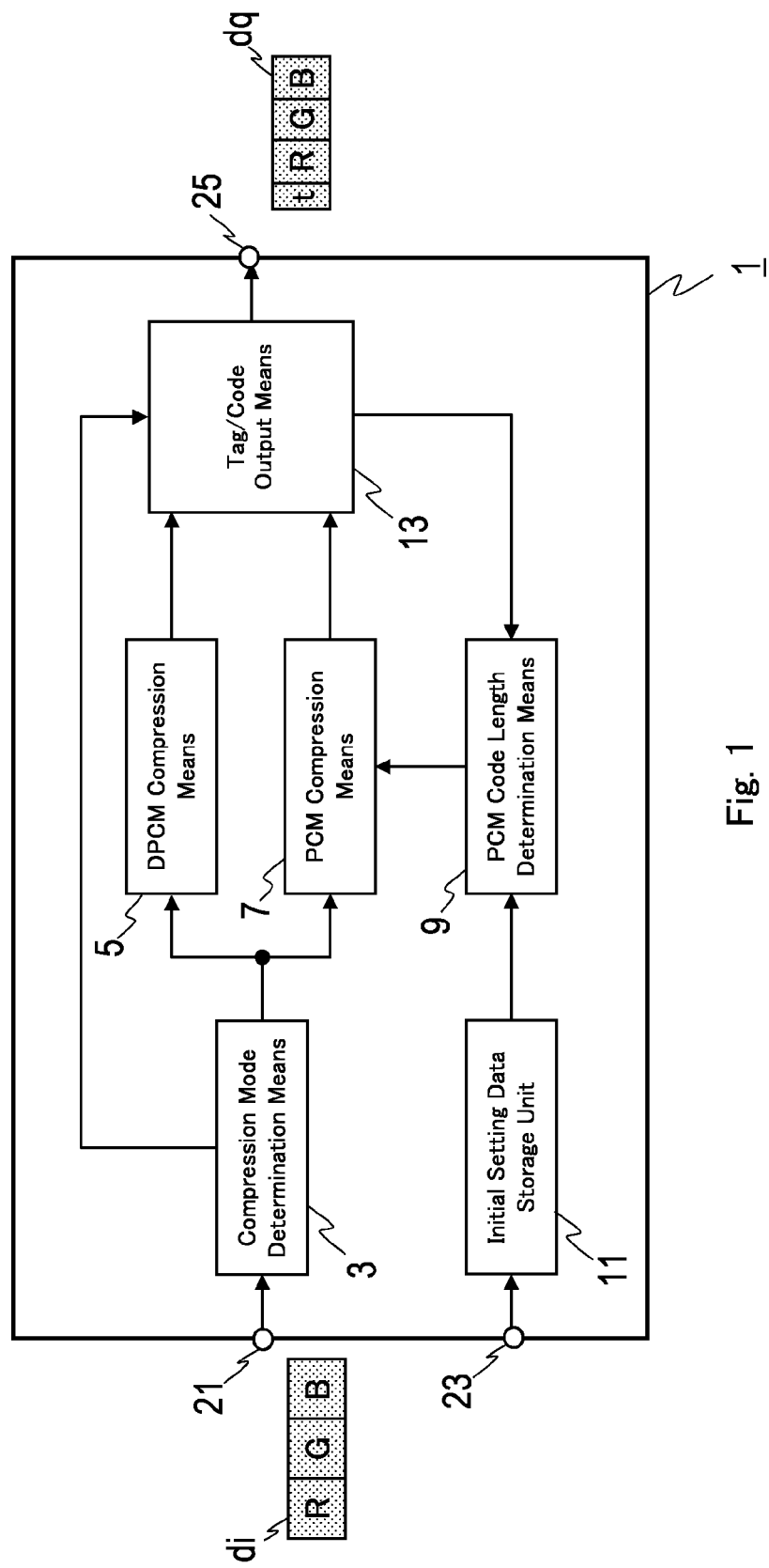
FIG. 1 is a schematic block diagram of an image encoding device of the present invention.

FIG. 1 is a schematic block diagram of an image encoding device of the present invention. An image encoding device 1 includes compression mode determination means 3, DPCM compression means 5, PCM compression means 7, PCM code length determination means 9, an initial setting data storage unit 11, tag/code output means 13, an image data input terminal 21, an initial setting data input terminal 23, and an encoded data output terminal 25.

The compression mode determination means 3, the DPCM compression means 5, the PCM compression means 7, the PCM code length determination means 9, and the tag/code output means 13 are functional means for performing predetermined calculation processing to inputted data using hardware (and also software as needed basis). The initial setting data storage unit 11 is storage means for storing initial setting data inputted from the initial setting data input terminal 23. The detailed initial setting data is described later.

The image data input terminal 21 receives input of image data that becomes an encoding target. The image data includes a plurality pieces of pixel data. Hereinafter, the pixel data that currently is the encoding target is referred to as "target pixel data". The reference sign di in FIG. 1 designates target pixel data. The target pixel data di is transmitted to the compression mode determination means 3.

The compression mode determination means 3 is means for determining whether DPCM processing or PCM processing is performed in compressing the target pixel data di. In the embodiment, the compression mode determination means 3 determines whether a DPCM compression mode or a PCM compression mode is selected based on a difference value between the target pixel data di and predicted data dip, which is calculated based on the pixel data inputted immediately before the target pixel data di. In the case that the target pixel data di is pixel data of a head pixel, the compression mode determination means 3 forcedly determines the compression mode to be the PCM.

In the embodiment, a code length of DPCM processing is previously determined, and the code length is referred to as a "DPCM code length". The compression mode determination means 3 selects the DPCM processing when the difference value between the target pixel data di and the predicted data dip can be expressed by the previously-determined DPCM code length, and the compression mode determination means 3 selects the PCM processing when the difference value can be expressed only by a code length exceeding the DPCM code length.

That is, the compression mode determination means 3 selects the DPCM compression mode for the target pixel data di when a condition indicated by the following mathematical formula 1 holds. The compression mode determination means 3 selects the PCM compression mode when the condition does not hold. Where diff is the difference value and Xd is the DPCM code length.

$$-2^{(Xd-1)} \leq \text{diff} < 2^{(Xd-1)}$$ (Mathematical formula 1)

Various methods are adopted as a method for generating the predicted data dip. It is assumed that the compression mode determination means 3 includes a buffer in which most-recently-inputted pixel data dj is temporarily stored, and that the predicted data dip is determined by the pixel data dj read from the buffer.

When determining the processing mode to be the DPCM, the compression mode determination means 3 outputs the difference value diff to the DPCM compression means 5, and outputs a tag indicating the DPCM compression mode to the tag/code output means 13. When determining the processing mode to be the PCM, the compression mode determination means 3 outputs the target pixel data di to the PCM compression means 7, and outputs a tag indicating the PCM compression mode to the tag/code output means 13.

At this point, it is assumed that the tag indicating the compression mode is expressed by one bit, and that the tag "0" indicates the DPCM while the tag "1" indicates the PCM.

When the difference value diff is inputted from the compression mode determination means 3, the DPCM compression means 5 performs compression conversion of the difference value diff into the data having the DPCM code length. At this point, the data may be expressed by an integer with polar sign ±.

When the target pixel data di is inputted from the compression mode determination means 3, the PCM compression means 7 performs the compression conversion of the target pixel data di into the data having the code length provided from the PCM code length determination means 9. Hereinafter, the code length provided from the PCM code length determination means 9 is referred to as a "PCM code length". When the number of bits of the target pixel data di is larger than the "PCM code length", the encoding is performed using the PCM code length by dropping a lower bit.

The PCM code length determination means 9 determines the "PCM code length" of the target pixel data di based on initial setting data stored in the initial setting data storage unit 11 and data (corresponding to "processed pixel number data" and "processed code length total data") indicating an encoding progress situation provided from the tag/code output means 13.

The tag/code output means 13 generates encoded data by adding the one-bit tag indicating the compression mode to the post-compression data outputted from the DPCM compression means 5 or PCM compression means 7, and the tag/code output means 13 outputs the encoded data from the encoded data output terminal 25. The reference sign dq in FIG. 1 designates the encoded data in which the target pixel data di is encoded.

A detailed encoding method of the device 1 will be described below by referring to a specific example including a PCM code length determination method of the PCM code length determination means 9.

It is assumed that the pixel data is expressed by each of 10-bit R, G, and B, namely, the total of 30 bits, and that the input image data is constructed by 10-pixel data in a horizontal direction and 10-pixel data in a vertical direction (the total of 30×10×10=3000 bits). In the embodiment, the encoding is performed at a compression ratio of 80% in order to store the data in a 2400-bit memory area.

Figure 2:
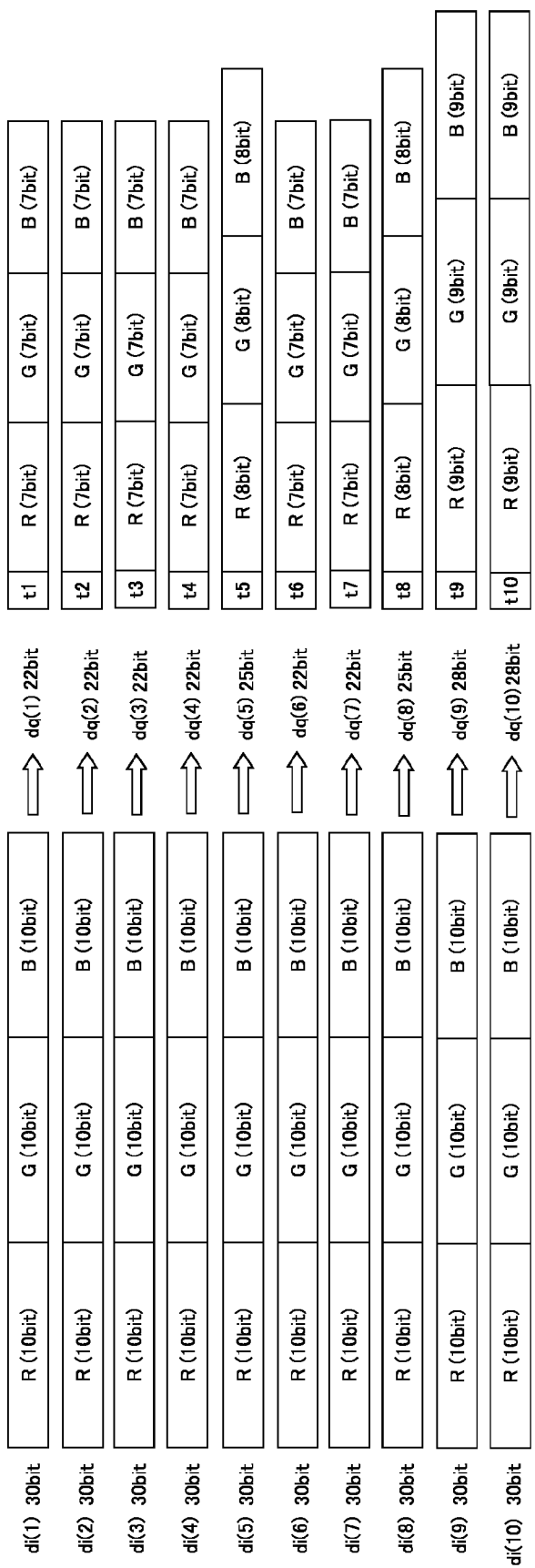
FIG. 2 is a view illustrating how to encode pixel data.
Figure 3:
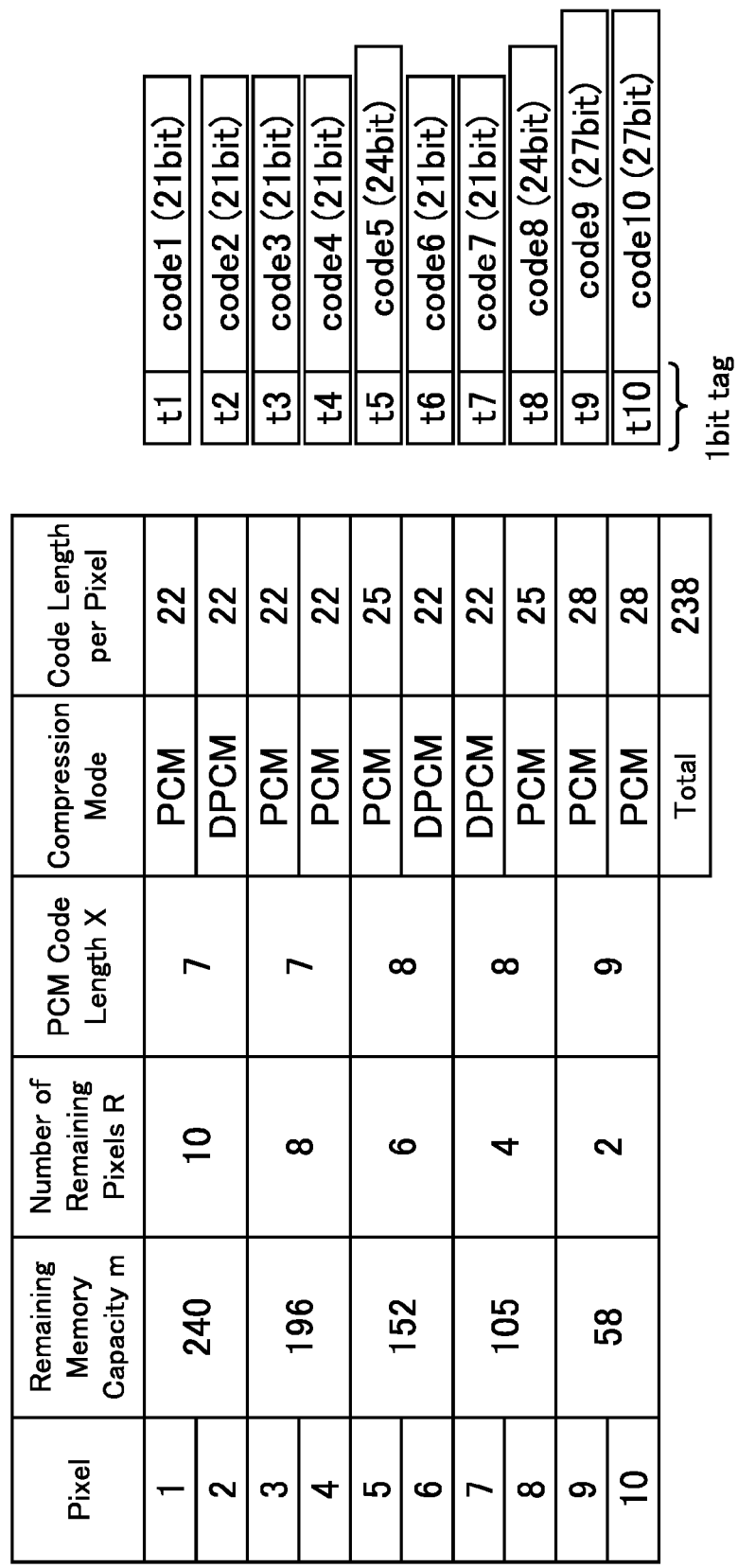
FIG. 3 is a view illustrating how to encode pixel data.

FIGS. 2 and 3 are views illustrating how to encode the pixel data in the embodiment. In FIG. 2, the reference signs di(1) to di(10) indicate the pieces of target pixel data of a first pixel to a tenth pixel, which are disposed in an identical line. The reference signs dq(1) to dq(10) indicate the pieces of encoded data that are obtained after the pieces of target pixel data di(1) to di(10) are encoded. One-bit tags t1 to t10 are added to the pieces of encoded data, respectively.

In FIG. 3, among the pieces of data obtained after the encoding, the pieces of data except the tags are expressed as code(1) to code(10) without distinguishing R, G, and B from one another.

As described above, the DPCM compression means 5 of the embodiment generates the code having the predetermined fixed length. In the embodiment, it is assumed that the code length (the DPCM code length) of the code compressed by the DPCM compression means 5 is a maximum integer, which does not exceed a value obtained by multiplying the number of bits per color by the compression ratio. More specifically, it is assumed that the code length is 7 bits, which are the maximum integer that does not exceed the value obtained by multiplying 10 bits by 80%.

In the embodiment, it is assumed that a compression memory capacity per line is fixed in order to simplify address calculation of a frame memory. That is, the 1-line compression memory capacity is fixed to 240 bits in order to store the 10-line compression data in the 2400-bit memory area.

As described above, the PCM compression mode is set to the head pixel. That is, in the embodiment, the PCM compression mode is set to the head pixel in each line.

In the embodiment, it is assumed that the PCM code length determination means 9 determines the code length for each two pixels. This means that, in the case where the compression mode of an even-numbered pixel counting from the head pixel is the PCM, if a pixel immediately before the even-numbered pixel is also the PCM, the encoding is performed using the code length identical to that of the pixel immediately before the even-numbered pixel.

The image data that becomes the target and necessary information on the compression data for intended output are inputted as the initial setting data from the initial setting data input terminal 23. Specifically, the number of pixels A per line, the number of colors C per pixel, and information M on the compression memory capacity per line are inputted from the initial data input terminal 23, and stored in the initial setting data storage unit 11. As described above, in the embodiment, A=10, C=3, and M=240 are stored in the initial setting data storage unit 11.

That is, in the embodiment, one line corresponds to the "predetermined pixel group", the number of pixels per line corresponds to "the number of pixels constituting the predetermined pixel group", and the compression memory capacity per line corresponds to the "allowable value".

In the pixels belonging to the first line, the pixel data di(1) of the head pixel is inputted from the image data input terminal 21. When sensing that the pixel data is the head data, the compression mode determination means 3 sets the compression mode to the PCM, and transmits the pixel data to the PCM compression means 7. The compression mode determination means 3 internally includes a buffer that temporarily stores the information on the pixel data until the next pixel is inputted.

The PCM compression means 7 reads the information on the PCM code length from the PCM code length determination means 9. At this point, the PCM code length determination means 9 uses a maximum integer X satisfying the condition indicated by the following mathematical formula 2 to determine the code length per color. Where R is the number of remaining pixels of the encoding target line and m is the remaining compression memory capacity.

$$(1+X \cdot C) \cdot R \leq m \quad \text{(Mathematical formula 2)}$$

A bit length Y of the encoded data per pixel is obtained from the following mathematical formula 3 using X calculated by the mathematical formula 2.

$$Y = 1 + X \cdot C \quad \text{(Mathematical formula 3)}$$

In the mathematical formula 2 and the mathematical formula 3, as described above, it is assumed that the tag indicating the compression mode is expressed by one-bit information.

At this point, R=A=10 and m=M=240 are obtained because the target pixel data di(1) is the pixel data of the head pixel, and C=3 is also obtained. Therefore, the code length X is determined to be 7 bits by substituting R=A=10, m=M=240, and C=3 into the mathematical formula 2. The PCM code length determination means 9 provides the information indicating that the code length is 7 bits for each color to the PCM compression means 7. The PCM compression means 7 compresses each of R, G, and B of the target pixel data di into the 7-bit code, and transmits the 7-bit code to the tag/code output means 13.

In the embodiment, the data expressed by each of 10-bit R, G, and B is compressed into the 7-bit data. As to the compression method, for example, the data can be compressed into the 7-bit data by dropping lower 3 bits.

The tag/code output means 13 receives the information indicating the PCM compression mode from the compression mode determination means 3, and outputs the encoded data dq(1), in which the tag t1 of "1" is added to the head of the encoded data code1 provided from the PCM compression means 7, from the encoded data output terminal 25.

The tag/code output means 13 internally includes the buffer, and data (hereinafter referred to as "processed pixel number data") Zr relating to the number of encoded pixel and data (hereinafter referred to as "processed code length total data") Zm relating to the total of the code lengths are temporarily stored in the internal buffer. The total of the code lengths may be updated every time the line of the target pixel data changes.

Then the subsequent second pixel data di(2) is inputted from the image data input terminal 21. The compression mode determination means 3 reads the first pixel data di(1) that is the most recent pixel data from the internal buffer, and calculates the difference value between the second pixel data di(2) and the first pixel data di(1). At this point, it is assumed that the difference value data can be expressed by 7 bits that are the DPCM code length of each color.

In this case, the compression mode determination means 3 determines the compression mode to be the DPCM, and outputs the difference value data to the DPCM compression means 5. The DPCM compression means 5 generates compressed encoded data having the DPCM code length based on the provided difference value data, and outputs the encoded data to the tag/code output means 13. The tag/code output means 13 receives the information indicating the DPCM compression mode from the compression mode determination means 3, and outputs the encoded data dq(2), in which the tag t2 of "0" is added to the head of the encoded data code 2 provided from the DPCM compression means 5, from the encoded data output terminal 25. At this point, in the internal buffer of the tag/code output means 13, the processed pixel number data of "2" is stored, and the processed code length total data of "44" is stored as the total of the code lengths of the pieces of encoded data dq(1) and dq(2).

Then the subsequent third pixel data di(3) is inputted from the image data input terminal 21. The compression mode determination means 3 reads the second pixel data di(2) that is the most recent pixel data from the internal buffer, and calculates the difference value between the third pixel data di(3) and the second pixel data di(2). At this point, it is assumed that the difference value data cannot be expressed by 7 bits, and the compression mode is determined to be the PCM.

The PCM compression means 7 reads the information on the PCM code length from the PCM code length determination means 9. The PCM code length determination means 9 reads the processed pixel number data Zr and the processed code length data Zm from the tag/code output means 13, and calculates the number of remaining pixels R and the remaining compression memory capacity m. Because of the processed pixel number data Zr=2, the number of remaining pixels R=A−Zr=8 is obtained from the number of pixels A=10 per line stored in the initial setting data storage unit 11. Because of the processed code length data Zm=44, the remaining compression memory capacity m=M−Zm=196 is obtained from the information on the compression memory capacity per line M=240 stored in the initial setting data storage unit 11.

The PCM compression means 7 substitutes the latest R and m into the mathematical formula 2, and determines the code length per color using the maximum integer X satisfying $$(1+3X)\cdot 8 \le 196.$$

Therefore, X=7 is determined, namely the PCM code length is determined to be 7.

The PCM code length is determined to be 7 also in the case that the compression mode is the PCM for the next pixel data.

The PCM code length determination means 9 provides the information indicating that the code length is 7 bits in each color, to the PCM compression means 7. The PCM compression means 7 compresses each of R, G, and B of the target pixel data di(3) into the 7-bit code, and transmits the 7-bit code to the tag/code output means 13. The tag/code output means 13 receives the information indicating the PCM compression mode from the compression mode determination means 3, and outputs the encoded data dq(3), in which the tag t3 of "1" is added to the head of the encoded data code 3 provided from the PCM compression means 7, from the encoded data output terminal 25.

Then the subsequent fourth pixel data di(4) is inputted from the image data input terminal 21. The compression mode determination means 4 reads the third pixel data di(3) that is the most recent pixel data from the internal buffer, and calculates the difference value between the fourth pixel data di(4) and the third pixel data di(3). At this point, it is assumed that the difference value data cannot be expressed by 7 bits, and the compression mode is determined to be the PCM.

The PCM compression means 7 reads the information on the PCM code length from the PCM code length determination means 9. The PCM code length determination means 9 checks that the compression mode of the most recently odd-numbered pixel is also the PCM, and provides the PCM code length of "7" identical to that of the most recent pixel to the PCM compression means 7. The PCM compression means 7 compresses each of R, G, and B of the target pixel data di(4) into the 7-bit code, and transmits the 7-bit code to the tag/code output means 13. The tag/code output means 13 receives the information indicating the PCM compression mode from the compression mode determination means 3, and outputs the encoded data dq(4), in which the tag t4 of "1" is added to the head of the encoded data code 4 provided from the PCM compression means 7, from the encoded data output terminal 25.

The encoding is performed to the pieces of target pixel data di(5), di(6), . . . by the similar procedure.

When the encoded data dq(10) is generated for the final pixel data di(10) of one line, the head pixel data of the next line (a second line) is inputted as the target pixel data from the image data input terminal 21. The compression mode is determined to be the PCM because of the head pixel. In encoding and outputting the head pixel, the tag/code output means 13 updates the processed pixel number data Zr to "1", and updates the processed code length data to the code length of the encoded data of the pixel data of the head pixel.

In the embodiment, for the sake of convenience, the encoded data is outputted by one pixel from the encoded data output terminal 25 after the encoding is sequentially performed by one pixel. Alternatively, the pieces of encoded data may be outputted by two pixels.

FIG. 4 is a view illustrating a case in which the pieces of encoded data are outputted by two pixels from the encoded data output terminal 25. FIG. 4A illustrates the pieces of encoded data dq(1) to dq(10) arrayed lengthwise like FIG. 3. FIG. 4B illustrates the output data when the pieces of encoded data are outputted by two pixels.

In the case that the encoded data is outputted by one pixel, it is necessary to sequentially decode the encoded data by one pixel on a decoding device side. In the DPCM compression mode, actually the decoding cannot be performed until the most recent pixel data is decoded. However, in the case that the compression mode of the subsequent pixel data is the PCM, the decoding can be performed without waiting for the decoding of the most recent pixel data.

From this standpoint, the pieces of encoded data relating to the plurality of pixels are collectively outputted to concurrently perform decoding processing, which allows shortening of a time necessary for the decoding.

In this context, FIG. 4B illustrates the configuration in which the pieces of encoded data are collectively generated for each two pixels and outputs from the encoded data output terminal 25. More specifically, at the time the compression processing is completed to the pieces of pixel data of the odd-numbered and even-numbered pixels, the tags of the pieces of pixel data of the odd-numbered and even-numbered pixels are added to the head as two-bit data, and then the encoded data of the pixel data of the odd-numbered pixel and the encoded data of the pixel data of the even-numbered pixel are arrayed behind the tags, whereby the encoded data is generated and outputted from the encoded data output terminal 25.

In FIG. 4B, two-bit padding is added. In the case that a redundancy is generated for the one-line memory capacity, the two-bit padding is provided in order to fill the redundancy. The padding is not necessarily added.

On the decoding device side, when the encoded data is received, the compression mode of each of the pixel data of the odd-numbered pixel and the pixel data of the even-numbered pixel is recognized based on the two-bit tag of the head. That is, the tag of "00" indicates that the compression modes of the pixel data of the odd-numbered pixel and the pixel data of the even-numbered pixel are the PCM, the tag of "11" indicates that the compression modes of the pixel data of the odd-numbered pixel and the pixel data of the even-numbered pixel are the DPCM, the tag of "01" indicates that the compression mode of the pixel data of the odd-numbered pixel is the PCM while the compression mode of the pixel data of the even-numbered pixel is the DPCM, and the tag of "10" indicates that the compression mode of the pixel data of the odd-numbered pixel is the DPCM while the compression mode of the pixel data of the even-numbered pixel is the PCM.

For the tag of "11", because the DPCM code length is fixed to 7 bits in the embodiment, it is found that the third bit to the ninth bit in the transmitted pieces of encoded data are the pieces of encoded pixel data of the odd-numbered pixels, and that the tenth bit to the sixteenth bit are the pieces of encoded pixel data of the even-numbered pixels. For the tag of "10", it is found that the third bit to the ninth bit are the pieces of encoded pixel data of the odd-numbered pixels, and that the codes from the tenth bit are the pieces of encoded pixel data of the even-numbered pixels.

For the tag of "01", it is found that seven bits counting from the tail end are the pieces of encoded pixel data of the even-numbered pixels, and that bits from one bit short of the head of the seven bits to the third bit counting from the head of the whole encoded data are the pieces of encoded pixel data of the odd-numbered pixels.

For the tag of "00", because the pieces of encoded pixel data of the odd-numbered and even-numbered pixels are the equal code length, the code length from the third bit is divided into two, and it is found that the first half is the pieces of encoded pixel data of the odd-numbered pixels, and that the second half is the pieces of encoded pixel data of the even-numbered pixels.

Thus, even if the pieces of two-pixel encoded data are continuously transmitted, the odd-numbered encoded data and the even-numbered encoded data can be decoded based on the compression mode, because the odd-numbered encoded data and the even-numbered encoded data can be recognized.

Alternatively, the decoding device side includes the processing mechanism similar to that of the PCM code length determination means 9, the code length of the encoded data of each pixel in which the compression mode is the PCM is calculated, and the encoded data may be specified for each pixel based on the calculated code length.

According to the configuration of the embodiment, particularly in the PCM compression mode, the code length is variable according to the amount of uncompressed pixel data and the number of remaining available bits. Therefore, when the number of remaining bits is large, the image quality degradation caused by the compression can be suppressed by lengthening the code length. On the other hand, when the number of remaining bits is small, the code length can be controlled by shortening the code length such that all the remaining pieces of pixel data are stored in a storage area.

Figure 5:
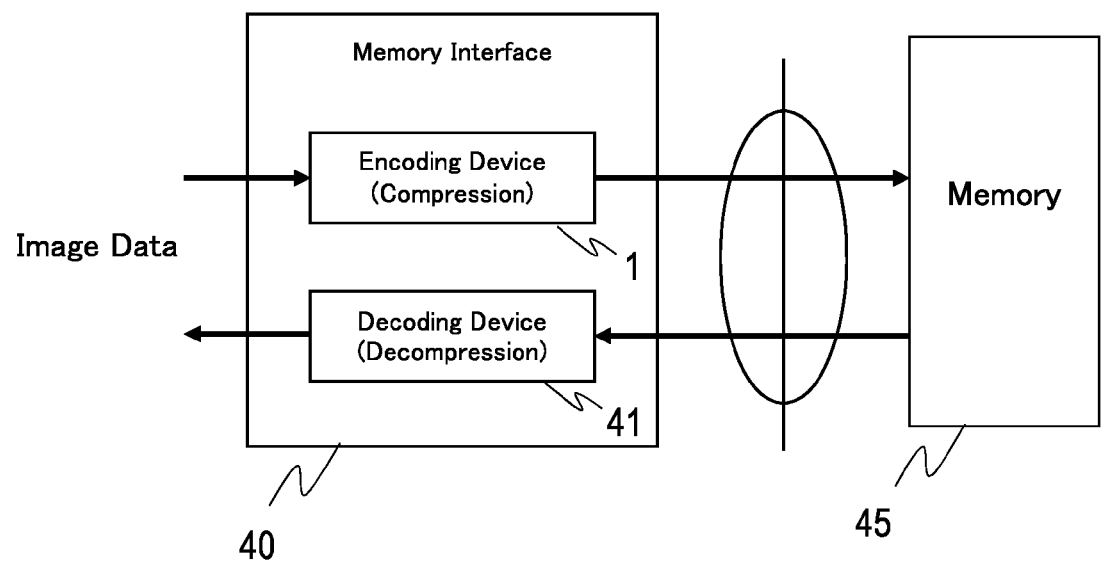
FIG. 5 illustrates an application example of the image encoding device.

The encoding device of the present invention is incorporated in an interface of an image memory, which allows the low-cost encoding/decoding to be implemented with a delay of several clocks while the image quality degradation is suppressed to a low level. Therefore, the encoding is performed when the data is written in the image memory, and the decoding is performed when the data is read from the image memory, the amount of data stored in the memory or the amount of data for memory accessing in unit time can be decreased to expect the reduction of the memory capacity or access bandwidth. FIG. 5 is a schematic diagram when the encoding device 1 of the present invention is applied to a memory interface 40.

The input image data is encoded by the encoding device 1 in the memory interface 40 according to the rule of the embodiment, and the image data is transmitted to a memory 45 through a signal line or an electric communication line while the data amount is compressed. The compressed data (the encoded data) is stored in the memory 45. On the other hand, in response to a read instruction, the compressed data is read from the memory 45 through the signal line or the electric communication line. The decoding device 41 in the memory interface 40 performs the decoding processing to the compressed data, the compressed data is restored as the image data, and the image data is outputted.

The encoding device of the present invention is not limited to the application to the interface of the image memory, and the encoding device can be used to compress the image data by incorporating the encoding device in a general image processing system. Therefore, the encoding device of the present invention can be used in all applications to which a general image compression technology is applied.

Other Embodiments

Other embodiments will be described below.

<1> In the configuration of the embodiment, the line memory is fixed, and the code length is determined for each line according to the remaining amount of memory and the number of unprocessed pixels. According to the completely identical principle, it is possible that the frame memory is fixed, and the code length is determined for each frame according to the remaining amount of memory and the number of unprocessed pixels.

Figure 6:
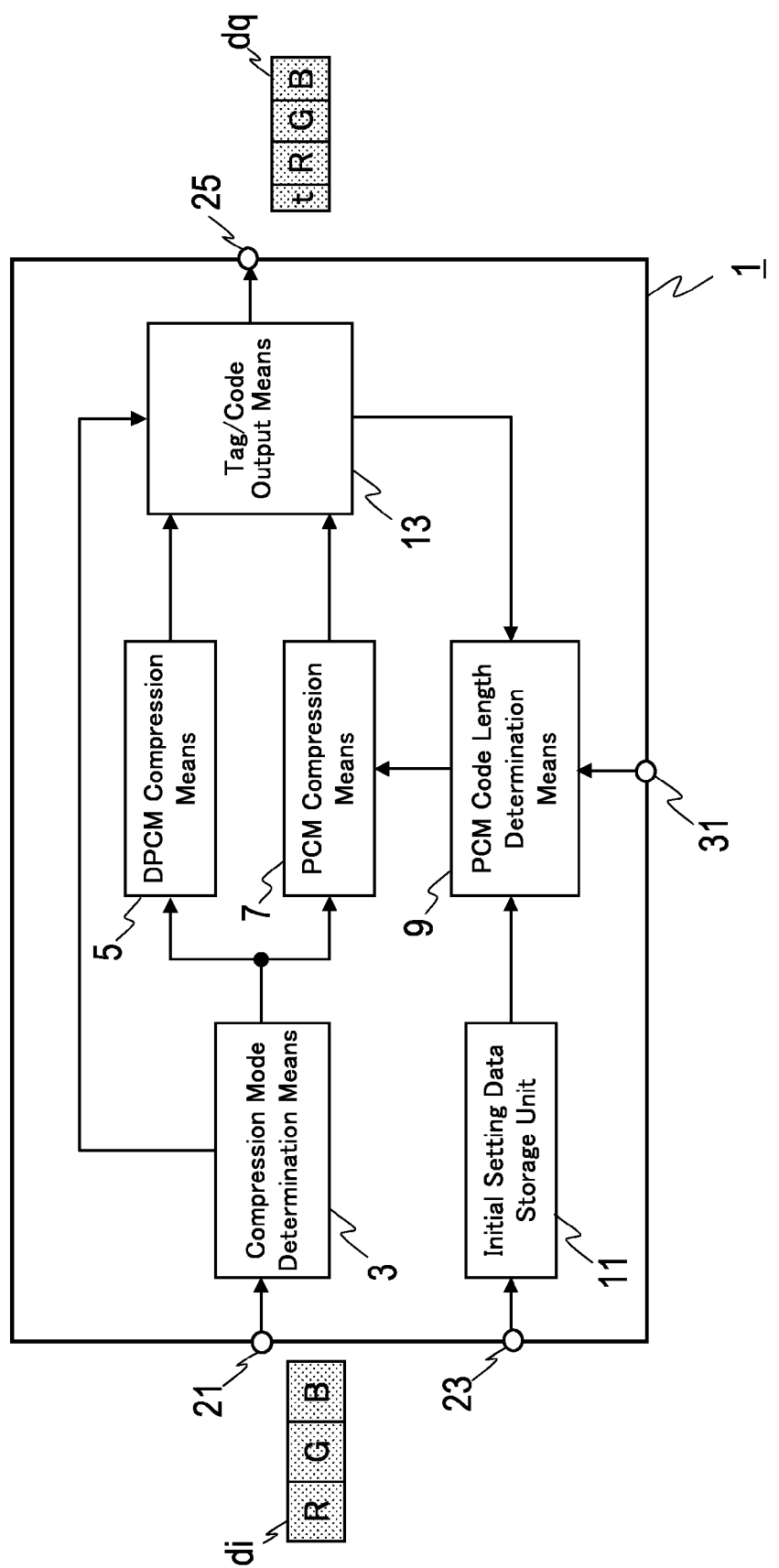
FIG. 6 is a schematic block diagram of another image encoding device of the present invention.

<2> As illustrated in FIG. 6, the encoding device includes a PCM code length setting information input terminal 31, and the PCM code length may forcedly be set from the outside using the PCM code length setting information input terminal 31. With this configuration, when a large value is set to the code length of the pixel located at the specific place, it is advantageous to the case where the place in which the degradation of the image quality is particularly undesirable exists.

More specifically, in the case where the screen is divided into right and left, a pixel column from a left end to a central portion is set to one line, and a pixel column from the central portion to a right end is set to another line, and the encoding is performed according to the method of the embodiment, when the pixel data of the head pixel in the right-half screen is encoded, preferably the PCM code length is set to a large value from the PCM code length setting information input terminal 31. Therefore, the image disturbance generated in the central portion of the screen can be prevented in checking the restored image data.

<3> In the configuration in FIGS. 1 and 6, the plurality of input terminals are included. Alternatively, the different input terminals may not necessarily be included when a mechanism that determines the input information is included. That is, various pieces of information are inputted from the common input terminal 21, the information on the pixel data is outputted to the compression mode determination means 3, the information on the initial setting data is outputted to the initial setting data storage unit 11, and the information on the PCM code length is outputted to the PCM code length determination means 9.

<4> In the configuration of the embodiment, the pixel data inputted from the compression mode determination means 3 is temporarily retained, and the most-recently-retained pixel data is used as the predicted data when the next pixel data is inputted. However, the most-recently-retained pixel data is not necessarily used as the predicted data, but the predicted data may be calculated by another method. For example, there is a method for calculating the predicted data based on a gradient of the pieces of data of the most recent several pixels.

<5> The tag/code output means 13 is not necessarily configured to acquire the information on the compression mode from the compression mode determination means 3 as long as the tag/code output means 13 is configured to recognize whether a transmission source of the data is the DPCM compression means 5 or the PCM compression means 7. In this case, the tag/code output means 13 adds the tag of "0" indicating the DPCM when the encoded data is provided from the DPCM compression means 5, and the tag/code output means 13 adds the tag of "1" indicating the PCM when the encoded data is provided from the PCM compression means 7.

<6> In the embodiment, referring to FIG. 4, the pieces of encoded data are outputted by two pixels from the encoded data output terminal 25. The unit of outputted pieces of encoded data is not limited to the two pixels, but the pieces of encoded data may be outputted by three or more pixels from the encoded data output terminal 25.

<7> In the embodiment, the pixel data is defined by the RGB format. However, the encoding can be performed in the similar principle even if another format (for example, a YUV format) is adopted.

<8> In the embodiment, it is assumed that the compression mode of the pixel data of the head pixel that corresponds to the head of the pixel group is the PCM. However, this rule does not necessarily have to be followed. For example, a predicted value of the head pixel is assumed to be a predetermined value a, and the compression mode determination means 3 may perform the processing of determining the compression mode to be one of the DPCM and the PCM by a procedure similar to that of the pixel data except the head pixel. In the case of α=0, the compression mode is determined to be one of the DPCM and the PCM according to the pixel data value of the head pixel.

<9> The encoding device 1 of the embodiment sets the compression mode to the PCM when the difference value between the target pixel data and the predicted data is larger than the predetermined value, more specifically, when the encoding cannot be performed using the predetermined DPCM code length. In other cases, the encoding device 1 sets the compression mode to the DPCM. Because Patent Document 1 filed by the applicant of the present application discloses a detailed operation to perform the compression processing of the data while the PCM processing and the DPCM processing are automatically changed, the overlapping description is omitted.

EXPLANATION OF REFERENCES

1: image encoding device
3: compression mode determination means
5: DPCM compression means
7: PCM compression means
9: PCM code length determination means
11: initial setting data storage unit
13: tag/code output means
21: image data input terminal
23: initial setting data input terminal
25: encoded data output terminal
31: PCM code length setting information input terminal
40: memory interface
41: decoding device
45: memory
di: (encoding) target pixel data
dq: encoded data

The invention claimed is:

1. An image encoding device that performs encoding processing by compressing image data including pieces of pixel data of a plurality of pixels arrayed in a scanning sequence, the image encoding device comprising:
compression mode determination means for determining a compression mode of target pixel data of the encoding processing to be one of DPCM and PCM based on the target pixel data and predicted data calculated by a predetermined method;
DPCM compression means for compressing a difference value between the target pixel data and the predicted data to DPCM encoded data having a predetermined DPCM code length when the compression mode determination means determines the compression mode to be the DPCM;
PCM compression means for compressing the target pixel data to PCM encoded data having an assigned PCM code length when the compression mode determination means determines the compression mode to be the PCM;
PCM code length determination means for calculating the PCM code length for each piece of the target pixel data such that a total of post-encoding code lengths becomes an allowable value or less in a unit of predetermined pixel group among the plurality of pixels, and transmitting the PCM code length to the PCM compression means; and
tag/code output means for producing and outputting output encoded data by adding a tag indicating whether the compression mode is the DPCM or the PCM according to the compression mode to the DPCM encoded data outputted from the DPCM compression means or the PCM encoded data outputted from the PCM compression means.

2. The image encoding device according to claim 1, wherein, based on initial setting data including information on the number of pixels constituting the predetermined pixel group and the allowable value and progress data including information on the number of processed pixels in which encoding processing of pixel data is already completed among the pixels constituting the predetermined pixel group and a processed code length total that is a total of post-encoding code lengths of the processed pixels, the PCM code length determination means derives the number of unprocessed pixels at the time of processing among the number of pixels constituting the predetermined pixel group and a producible code length total, and determines the PCM code length by a maximum code length which is a maximum value of an identical code length in a case where a total code length of pixel data of the number of the unprocessed pixels encoded using the identical code length does not exceed the producible code length total.

3. The image encoding device according to claim 2, wherein the predetermined pixel group is a plurality of pixels constituting one line in the image data, and
the allowable value is a maximum value of a line memory.

4. The image encoding device according to claim 2, wherein the predetermined pixel group is a plurality of pixels constituting one frame in the image data, and
the allowable value is a maximum value of a frame memory.

5. The image encoding device according to claim 1, wherein the PCM code length determination means is configured such that the PCM code length can be externally assigned, and is configured to output the assigned PCM code length to the PCM compression means when the PCM code length is assigned.

6. The image encoding device according to claim 1, wherein, for each predetermined number of pixels of at least two pixels, the tag/code output means puts tags respectively corresponding to pixel data of the predetermined number of pixels on a head, and the DPCM encoded data or the PCM encoded data of the pixel data of each pixel on the lower bit side of the tags, and produces and outputs the output encoded data.

7. The image encoding device according to claim 2, further comprising an initial setting data storage unit in which the initial setting data externally inputted is stored,
wherein the initial setting data is configured to include information on the number of pixels constituting the predetermined pixel group, information on the allowable value, and information on the number of colors per pixel.

8. The image encoding device according to claim 7, wherein the PCM code length determination means uses a maximum integer X satisfying the following expression $$(1+X \cdot C) \cdot (A-Zr) \leq (M-Zm)$$

to determine the PCM code length, where A is the number of pixels constituting the predetermined pixel group, M is the allowable value, and C is the number of colors, which are information included in the initial setting data, and Zr is the number of processed pixels and Zm is the processed code length total, which are information included in the progress data.

9. The image encoding device according to claim 7, wherein the PCM code length determination means uses a maximum integer X satisfying the following expression $$(T+X \cdot C) \cdot (A-Zr) \leq (M-Zm)$$

to determine the PCM code length, where A is the number of pixels constituting the predetermined pixel group, M is the allowable value, and C is the number of colors, which are information included in the initial setting data, Zr is the number of processed pixels and Zm is the processed code length total, which are information included in the progress data, and T is the code length of the tag.

10. The image encoding device according to claim 2, wherein the PCM code length determination means determines a value equal to the PCM code length of the most recent pixel data to be the PCM code length of the target pixel data based on information on the number of processed pixels included in the progress data, when the pixel of the target pixel data corresponds to an even-numbered pixel counting from a head pixel in the predetermined pixel group and when the compression mode of the most recent pixel data is the PCM.

11. The image encoding device according to claim 1, wherein the compression mode determination means determines the compression mode to be the DPCM when the following expression $$-2^{(Xd-1)} \leq \text{diff} < 2^{(Xd-1)}$$

holds, and determines the compression mode to be the PCM when the expression does not hold, where diff is the difference value and Xd is the DPCM code length.

12. An image encoding method for performing encoding processing by compressing image data including pieces of pixel data of a plurality of pixels arrayed in a scanning sequence, the image encoding method comprising:
a compression mode determination step of determining a compression mode of target pixel data of the encoding processing to be one of DPCM and PCM based on the target pixel data and predicted data calculated by a predetermined method;
a compression step of performing compression processing based on the compression mode of the DPCM or the PCM, the compression mode being determined in the compression mode determination step; and
a tag-equipped encoded data generation step of producing and outputting output encoded data by adding a tag indicating whether the compression mode is the DPCM or the PCM to the data generated in the compression step, wherein
the compression step is a step of compressing a difference value between the target pixel data and the predicted data to DPCM encoded data having a predetermined DPCM code length when the compression mode is determined to be the DPCM in the compression mode determination step, and of compressing the target pixel data to PCM encoded data having a PCM code length determined in a PCM code length determination step when the compression mode is determined to be the PCM, and
the PCM code length determination step is a step of calculating the PCM code length for each piece of the target pixel data such that a total of post-encoding code lengths becomes an allowable value or less in a unit of predetermined pixel group among the plurality of pixels.

13. The image encoding method according to claim 12, wherein
the PCM code length determination step is a step of,
based on initial setting data including information on the number of pixels constituting the predetermined pixel group and the allowable value and progress data including information on the number of processed pixels in which encoding processing of pixel data is already completed among the pixels constituting the predetermined pixel group and a processed code length total that is of a total of post-encoding code lengths of the processed pixels,
deriving the number of unprocessed pixels at the time of processing among the number of pixels constituting the predetermined pixel group and a producible code length total, and
determining the PCM code length by a maximum code length which is a maximum value of an identical code length in a case where a total code length of pixel data of the number of the unprocessed pixels encoded using the identical code length does not exceed the producible code length total.

* * * * *